(12) United States Patent
Witkowski et al.

(10) Patent No.: US 12,533,104 B2
(45) Date of Patent: Jan. 27, 2026

(54) VASCULAR MONITORING SYSTEM

(71) Applicants: BAXTER INTERNATIONAL INC., Deerfield, IL (US); BAXTER HEALTHCARE SA, Glattpark (CH)

(72) Inventors: Shannon Witkowski, St. Paul, MN (US); Michael Scheidnes, Maple Grove, MN (US); Sung Kwon, St. Paul, MN (US); James Studer, Beldenville, WI (US)

(73) Assignees: BAXTER INTERNATIONAL INC., Deerfield, IL (US); BAXTER HEALTHCARE SA, Glattpark (CH)

( * ) Notice: Subject to any disclaimer, the term of this patent is extended or adjusted under 35 U.S.C. 154(b) by 253 days.

(21) Appl. No.: 17/294,062

(22) PCT Filed: Nov. 15, 2018

(86) PCT No.: PCT/US2018/061191
§ 371 (c)(1),
(2) Date: May 14, 2021

(87) PCT Pub. No.: WO2020/101680
PCT Pub. Date: May 22, 2020

(65) Prior Publication Data
US 2022/0022841 A1    Jan. 27, 2022

(51) Int. Cl.
*A61B 8/06*    (2006.01)
*A61B 8/00*    (2006.01)
*G01F 1/663*    (2022.01)

(52) U.S. Cl.
CPC .............. *A61B 8/06* (2013.01); *A61B 8/445* (2013.01); *A61B 8/461* (2013.01); *A61B 8/488* (2013.01); *G01F 1/663* (2013.01)

(58) Field of Classification Search
CPC ........... A61B 8/06; A61B 8/461; A61B 8/488; G01F 1/663
See application file for complete search history.

(56) References Cited

U.S. PATENT DOCUMENTS

| 5,289,821 A | 3/1994 | Swartz |
| 7,206,426 B1 * | 4/2007 | Julstrom .............. H04R 25/558 |
| | | 381/322 |

(Continued)

FOREIGN PATENT DOCUMENTS

| CN | 102215744 A | 10/2011 |
| CN | 101933801 A | 6/2013 |

(Continued)

OTHER PUBLICATIONS

Direct Monitoring of Microvascular Anastomoses with the 20-MHz Ultrasonic Doppler Probe: An Experimental and Clinical Study, Plastic and Reconstructive Surgery, vol. 81, No. 2, Feb. 1, 1988, pp. 149-158 (Year: 1988).*

(Continued)

*Primary Examiner* — Rochelle D Turchen
(74) *Attorney, Agent, or Firm* — K&L Gates LLP

(57) ABSTRACT

A Doppler blood flow monitoring device (150) includes a signal generation module, a signal reception module, a signal filtration module, a signal conversion module, at least one speaker, and a user interface (304). The signal generation module is configured to send a signal to a probe (106) positioned in a probe receptacle on a vascular coupler positioned about a patients vessel. The signal reception module is configured to receive a return signal from the probe. The signal filtration module is configured to filter the return signal. The signal conversion module is configured to convert the filtered signal into an audible indication and a visual indication corresponding to a characteristic of blood flow in the patients vessel. The at least one speaker (214) is (Continued)

configured to emit the first audible indication. Additionally, the user interface is configured to display the visual indication.

20 Claims, 10 Drawing Sheets

(56) References Cited

U.S. PATENT DOCUMENTS

| | | |
|---|---|---|
| 2004/0082868 A1 | 4/2004 | Campbell |
| 2008/0221418 A1 | 9/2008 | Al-Ali et al. |
| 2011/0112416 A1* | 5/2011 | Myr .................. A61B 5/681 |
| | | 600/509 |
| 2013/0116575 A1* | 5/2013 | Mickle ............ A61B 8/4227 |
| | | 600/479 |
| 2014/0276123 A1* | 9/2014 | Yang .................. G16H 40/63 |
| | | 600/513 |
| 2017/0196475 A1* | 7/2017 | Yoshizawa ............ A61B 5/055 |
| 2017/0296139 A1 | 10/2017 | Giaya |
| 2017/0307742 A1 | 10/2017 | Hope Simpson et al. |

FOREIGN PATENT DOCUMENTS

| | | |
|---|---|---|
| JP | H02193650 A | 7/1990 |
| JP | 03-151947 A | 6/1991 |
| JP | 2001-104308 A2 | 4/2001 |
| JP | 2006-503653 A | 2/2006 |
| JP | 2011019925 A | 2/2011 |
| JP | 2011-529362 A | 8/2011 |
| TW | 201322957 A | 6/2013 |
| WO | WO 2008100823 | 8/2008 |
| WO | 2016136992 A1 | 9/2016 |

OTHER PUBLICATIONS

Notice of Reasons for Rejection for Japanese Application No. 2021-523188 dated Nov. 22, 2022.
International Search Report; International Application No. PCT/US2018/061191; mailed Aug. 23, 2019—5 Pages.
Written Opinion of the International Searching Authority; International Application No. PCT/US2018/061191; mailed Aug. 23, 2019—7 Pages.
Singaporean Written Opinion from corresponding Singaporean Patent Application No. 11202102819P, mailed Dec. 22, 2022.
Second Office Action for Chinese Application No. 20188098946.2 dated May 17, 2024.
Japanese Notice of Reason for Rejection from corresponding Japanese Patent Application No. 2024-020963, issued Sep. 3, 2024. 3 pages.
Notice of Preliminary Rejection for Korean Patent Application No. 10-2021-7017516 dated Aug. 29, 2023.

* cited by examiner

VASCULAR MONITORING SYSTEM

CROSS-REFERENCE TO RELATED APPLICATIONS

This application is a U.S. National Stage of International Application No. PCT/US2018/061191 filed on Nov. 15, 2018, entitled "VASCULAR MONITORING SYSTEM".

BACKGROUND

Plastic and reconstructive surgery regularly uses free flaps, for example in breast reconstruction. In free flap tissue surgery, a free flap (e.g., tissue and/or muscle and its associated artery and vein) is removed from one part of the body or donor site and is reattached to another part of the body or recipient site. The artery and vein of the transferred tissue and/or muscle are then anastomosed to a native artery and vein in order to achieve blood circulation in the transferred free flap (e.g., tissue and/or muscle).

The anastomosis of the free flap tissue to the native tissue is typically done using microvascular techniques, including under microscopic visualization. In previous years, several surgical instruments and techniques have been developed to aid in anastomosis. One known system for creating an anastomosis is an anastomosis coupler, described in U.S. Pat. No. 7,192,400, the disclosure of which is incorporated herein by reference. This anastomotic coupler is a surgical instrument that allows a surgeon to more easily and effectively join together two blood vessel ends. The coupler involves the use of two fastener portions, in the shape of rings, upon which are secured respective sections of the vessel to be attached. Each fastener portion is also provided with a series of pins, and corresponding holes for receiving those pins, in order to close and connect the portions, and in turn the vessel, together (See FIGS. 7A, 7C and 7D).

While free flap surgeries have a history of success, highly undesirable consequences of a flap failure still remain a possibility. One of the main causes of flap failure is a lack of blood being supplied to the flap tissue after the free flap is reattached at the recipient site. Things that commonly disturb circulation in a flap include vascular occlusion, hemorrhage, or infection. When not enough blood is supplied to the flap tissue, tissue necrosis results. However, if it can be recognized early enough that the flap is not receiving adequate circulation, it may be saved, or salvaged. The window of time for salvaging the flap after a lack of blood flow is recognized is very small. It is therefore critical that any lack of blood flow in a transferred flap be quickly recognized.

Handheld Doppler probes, which are typically permanently positioned on the distal tip of a pen-like device instead of being placed or left within the body, are helpful in blood flow monitoring, but they suffer from several drawbacks. One drawback with handheld probes is their inability to be reliably positioned about a vessel.

It is of great importance after microvascular surgery to monitor the region of the surgery in order to make sure that the blood flow is maintained at the desired level and that no problems, such as thromboses have occurred. Should thrombosis occur, the transferred tissue would die. Other indirect means of monitoring the functioning of blood flow through blood vessels, which have been subjected to microvascular surgery, are also often inadequate. For example, surface temperature measurements, transcutaneous $PO_2$ monitoring, photo plethysmography and laser Doppler flow meters have been employed. However, these approaches generally require an accessible exposed portion of the flap. Additionally, buried free tissue transfers and intraoral flaps cannot be monitored effectively by these methods.

SUMMARY

The present disclosure provides improved vascular monitoring systems, devices and methods to improve the accessibility, detection and/or reliability of detecting blood flow to confirm vessel patency at an anastomotic site.

In one example embodiment, a Doppler blood flow monitoring device includes a signal generation module, a signal reception module, a signal filtration module, a signal conversion module, at least one speaker, and a user interface. The signal generation module is configured to send a signal to a probe positioned in a probe receptacle on a vascular coupler positioned about a patient's vessel. The signal reception module is configured to receive a return signal from the probe. The signal filtration module is configured to filter the return signal. The signal conversion module is configured to convert the filtered signal into an audible indication and a visual indication corresponding to a characteristic of blood flow in the patient's vessel. The at least one speaker is configured to emit the first audible indication. Additionally, the user interface is configured to display the visual indication.

In another example embodiment, a Doppler blood flow monitoring system includes a vascular coupler, a transducer, and a monitor. The vascular coupler is positioned about a patient's vessel. The transducer is attached to the vascular coupler. The monitor is configured to generate a signal to send to the transducer and the transducer is configured to emit an ultrasonic signal based on the signal generated by the monitor. Additionally, the ultrasonic signal is transmitted through the patient's vessel. The monitor is also configured to receive a return signal from the transducer and convert the return signal into a first indication and a second indication corresponding to a characteristic of blow flow in the patient's vessel.

In another example embodiment, a remote monitoring system includes a monitor and a remote database. The monitor is configured to generate a signal to send to a transducer positioned within a vascular coupler. The vascular coupler is positioned about a patient's vessel, the transducer is configured to emit an ultrasonic signal based on the signal generated by the monitor, and the ultrasonic signal is transmitted through the patient's vessel. The monitor is further configured to receive a return signal from the transducer and convert the return signal into a first indication and a second indication corresponding to a characteristic of blow flow in the patient's vessel. The remote database configured to receive one or more files associated with the first indication and store the one or more files associated with the first indication, wherein the one or more files are remotely accessible via a user device.

It is accordingly an advantage of the present disclosure to improve accessibility of blood flow data.

It is another advantage of the present disclosure to improve the detection of blood flow to confirm vessel patency.

It is another advantage of the present disclosure to provide remote monitoring of blood flow at an anastomotic site.

It is a further advantage of the present disclosure to reduce background noise from audio signals representing blood flow within a vessel.

It is yet a further advantage of the present disclosure to reduce the occurrence of free flap failure and serious adverse events due to insufficient blood flow in a free flap.

It is still another advantage of the present disclosure to provide a system, device and/or method for early detection of insufficient blood flow or circulation in a free flap.

Additional features and advantages of the disclosed vascular monitoring system, device and method are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein. Moreover, it should be noted that the language used in the specification has been principally selected for readability and instructional purposes, and not to limit the scope of the inventive subject matter.

DETAILED DESCRIPTION OF EXAMPLE EMBODIMENTS

As discussed above, vascular monitoring system, device and method are provided to improve the accessibility, detection and/or reliability of detecting blood flow to confirm vessel patency at an anastomotic site. While free flap surgeries have a history of success, highly undesirable consequences of a flap failure still remain a possibility. One of the main causes of flap failure is a lack of blood being supplied to the flap tissue after the free flap is reattached at the recipient site. Things that commonly disturb circulation in a flap include vascular occlusion, hemorrhage, or infection. When not enough blood is supplied to the flap tissue, tissue necrosis results. However, the vascular monitor system, device and methods disclosed herein advantageously enable early detection of insufficient blood flow or circulation in a free flap so that it may be saved, or salvaged before tissue necrosis.

The above vascular monitoring system, device and methods may be used to monitor blood flow at the anastomotic site to confirm vessel patency of a surgical procedure, such as a free flap transfer micro vascular reconstruction. The above system, device and methods may be used in various environments such as a hospital operating room or a post-anesthesia care unit to detect blood flow and confirm vessel patency (either on-site or remotely) both intra-operatively and post-operatively. Free flap transfer may be used to recreate body parts from surgery due to cancer and injury using the patient's own tissue. Examples include breast reconstruction, tongue reconstruction, jaw and cheek reconstruction, hand and foot reconstruction after trauma injuries, etc. Typically, the microvascular anastomosis is the critical point of the surgery that determines the success of the flap. By providing monitoring capabilities of blood flow at an anastomotic site and increasing the access to these monitoring capabilities (e.g., remote access via a monitoring application on a user device such as a smart phone), the system, devices and methods disclosed herein allow early detection of low blood flow or lack of blood flow within the flap tissue thereby enabling a medical practitioner (e.g., a surgeon) to take corrective action before necrosis sets in and the free flap becomes unusable.

Multi-Component Probes and Monitor Connections

Figure 1A:
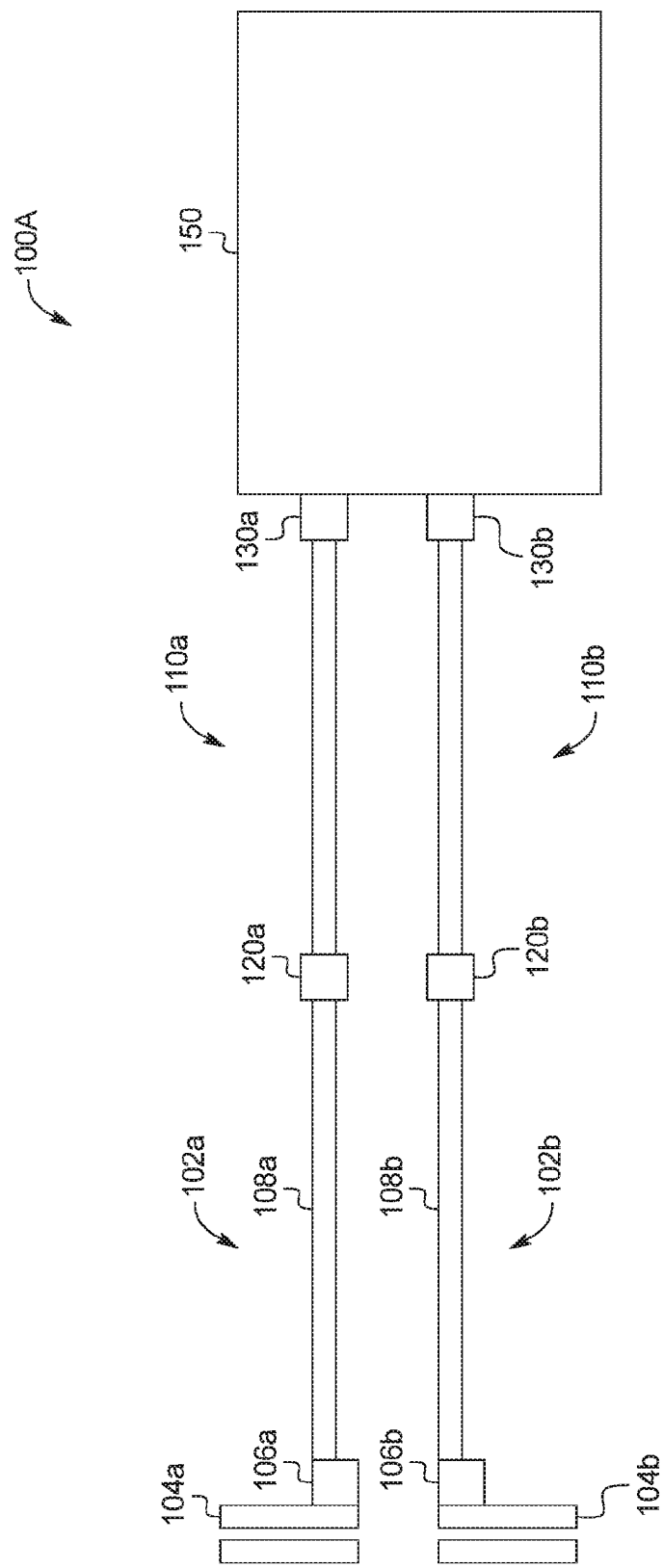
FIG. 1A is a schematic view of a probe system and monitor according to an example embodiment of the present disclosure.
Figure 1B:
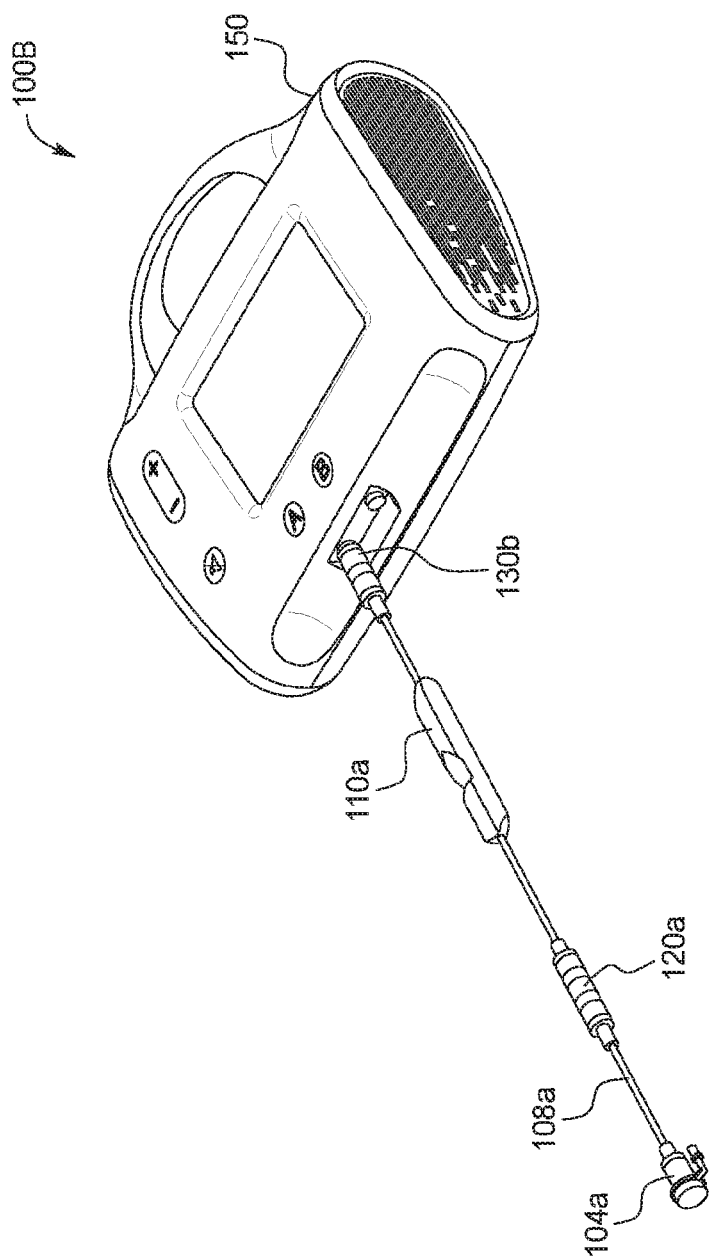
FIG. 1B is a perspective view of a probe system and monitor according to an example embodiment of the present disclosure.

FIG. 1A illustrates a schematic view of a flow monitor system 100A and FIG. 1B illustrates a perspective view of a flow monitor system 100B (both of which may be referred to generally as flow monitor system 100). Flow monitor system 100 may include multi-component probe systems 102a and 102b attached to a monitor 150 via external leads 110a and 110b. For example, probe system 102a may be attached to "channel A" of monitor 150 via external lead 110a while probe system 102b is attached to "channel B" of monitor 150 via external lead 110b. Specifically, monitor 150 may provide monitoring for at least two anastomosis sites by having at least two Doppler probe inputs or connector ports (illustrated in FIG. 2) and is capable of user selectable monitoring of either channel (e.g., "channel A" or "channel B"). It should be appreciated that while the embodiments illustrated in FIG. 1A and FIG. 1B use leads 110a, 110b to connect the probe systems 102a, 102b to the monitor 150, a wireless system may also be used wherein the probe is configured to communicate with the monitor without the use of leads 110.

Figure 7A:
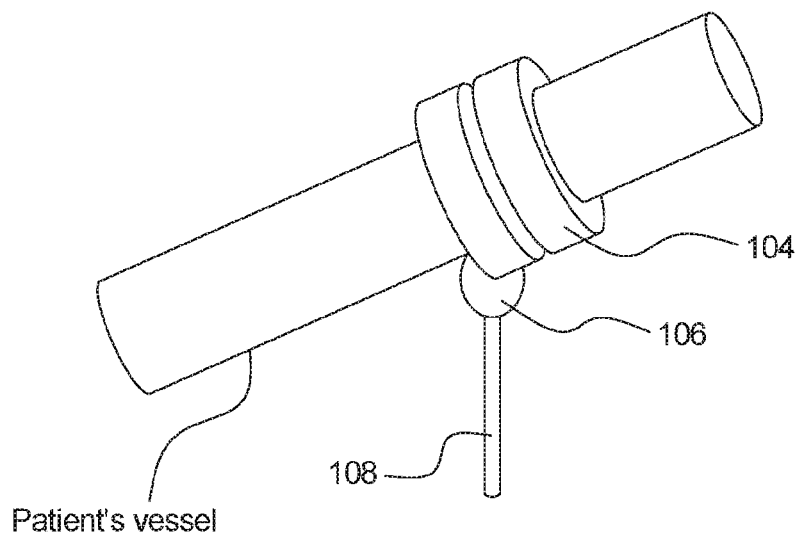
FIG. 7A is a partial perspective view of a vascular coupler with a transducer positioned about a patient's vessel according to an example embodiment of the present disclosure.
Figure 7B:
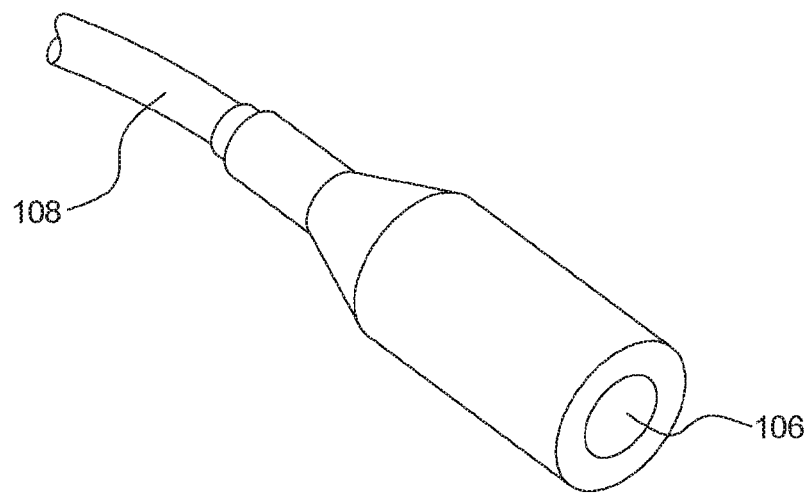
FIG. 7B is a partial perspective view of a transducer and a lead wire a according to an example embodiment of the present disclosure.
Figure 7C:
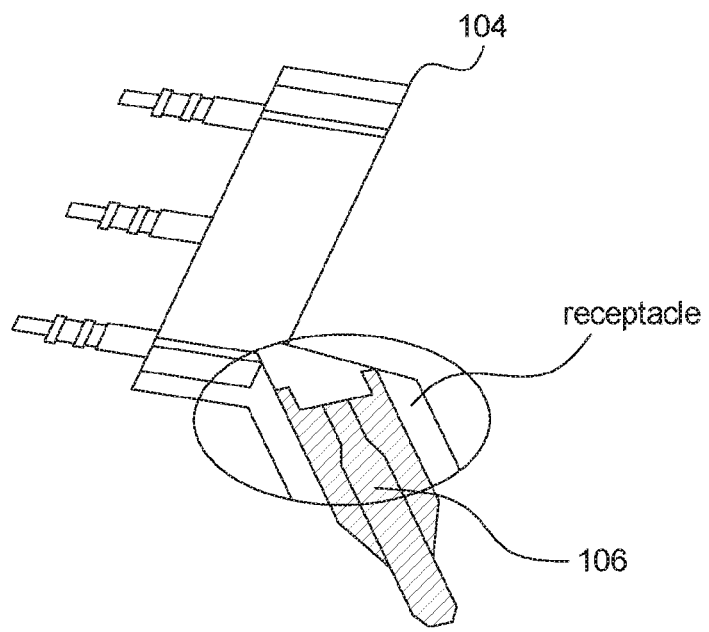
FIG. 7C is a partial cross-sectional view of a fastener of a vascular coupler and a transducer according to an example embodiment of the present disclosure.
Figure 7D:
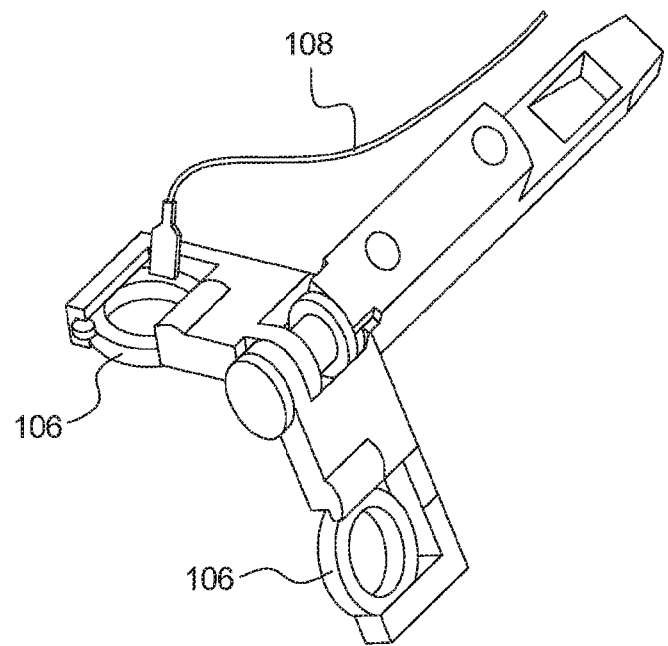
FIG. 7D is a perspective view of a vascular coupler with a transducer and a lead wire according to an example embodiment of the present disclosure.

Probe systems (e.g., probe systems 102a and 102b, generally referred to herein as probe system 102) include a set of fasteners 104a,b that may form a vascular coupler that couples two veins and/or arteries in an end-to-end anastomosis (See FIG. 7A). The probe systems 102 may each also include a transducer 106a,b (See FIGS. 7A, 7B, 7C and 7D) connected to at least one of the fasteners 104a,b. For example, one ring may include a probe holder with a press-fit Doppler Probe or transducer 106. In an example, a set or pair of fasteners (e.g., set of fasteners 104a, generally referred to herein as fasteners 104) may include a pair of high density polyethylene ("HDPE") rings with stainless steel pins (See FIG. 7C and FIG. 7D). The pair of rings form a permanent implant within the patient.

The set or pair of fasteners 104 or rings may be sized such that they fit on a similarly sized artery or vein. For example, the fasteners 104 or rings may have an inside diameter between 1.0 mm and 4.0 mm. In an example, the inside diameter of the fasteners 104 may be provided in size increments of 0.5 mm. It should be appreciated that the fasteners 104 or rings may be sized and shaped to accommodate veins and arteries typically encountered in microsurgical and vascular reconstructive procedures and are adapted for end-to-end anastomosis of such veins and arteries in the peripheral vascular system.

The vascular coupler formed from the set or pair of fasteners 104 may advantageously reduce anastomotic and flap ischemia time and provide intima-to-intima contact without any intraluminal foreign material (e.g., suture material), which also advantageously decreases the rate of thrombosis. Furthermore, the vascular coupler advantageously stents the anastomosed blood vessel and may be used to correct vessel size discrepancies. For example, the pair of fasteners 104 may be used to connect veins or arteries of different sizes. The fasteners also advantageously provide an increased patency rate compared to hand suturing as they provide intima-to-intima contact without any intraluminal foreign material.

The vascular coupler formed by the pair of fasteners 104 is adapted to create an end-to-end anastomosis of a blood vessel (e.g., a vein or artery) while retaining and maintaining the position of the transducer(s) 106 or other sensing device(s). The sensing devices, in turn, can be used to monitor or evaluate parameters associated with recovery and success of the surgical procedure, such as blood flow at an anastomotic site to confirm vessel patency. As discussed in more detail below, the sensing device(s) or transducer(s) 106 enable a medical practitioner (e.g., surgeon) to monitor and analyze the blood flow and/or blood velocity to determine the success of the surgery and/or to confirm vessel patency. The blood flow within the vessel may be monitored and one or more audio samples of the blood flow may be recorded and stored in a database. Storing multiple recordings of blood flow audio samples at different times in the database may allow a medical practitioner (e.g., surgeon) to make comparisons between the recordings. The systems and methods disclosed herein advantageously permit the recordation and evaluation of blood flow data over time to analyze surgery success and patient characteristics (e.g., blood flow and blood velocity). Since anastomotic failures tend to be rather abrupt, the ability to continually and reliably monitor and compare blood flow can be used to generate and send signals associated with the detection of failure events thereby enabling a medical practitioner (e.g., a surgeon) to take corrective action before necrosis sets in and the free flap becomes unusable. Additionally, as described in more detail below, the remote monitoring capabilities of the disclosed system, device and methods advantageously provide remote access so medical practitioners (e.g. surgeons) can detect failure events regardless of their location (e.g., at remote locations) and without degradation of audio quality.

Any transducer 106a,b suitable for ultrasonic Doppler monitoring may be used. In an example embodiment, the Doppler Probe or transducer is made of an approved implantable material such as HDPE or silicone. In another example, the transducer 106a,b comprises a piezoelectric crystal. The transducer 106a,b (hereinafter referred to generally as transducer 106) may be any size conforming to the dimensions of a corresponding transducer receptacle (See FIG. 7C) used on the fastener of a vascular coupler. For example, a circular transducer 106 is suitable to be received by a receptacle having its internal surface circular in shape. The transducer 106 may be a circular piezoelectric crystal being between about 0.5 mm to about 1 mm in size. In one example, the Doppler Probe or transducer 106 includes a tip with a circular piezoelectric crystal being between about 0.5 mm to about 1 mm in size, a Teflon-coated coax wire and a metal connector.

Figure 8:
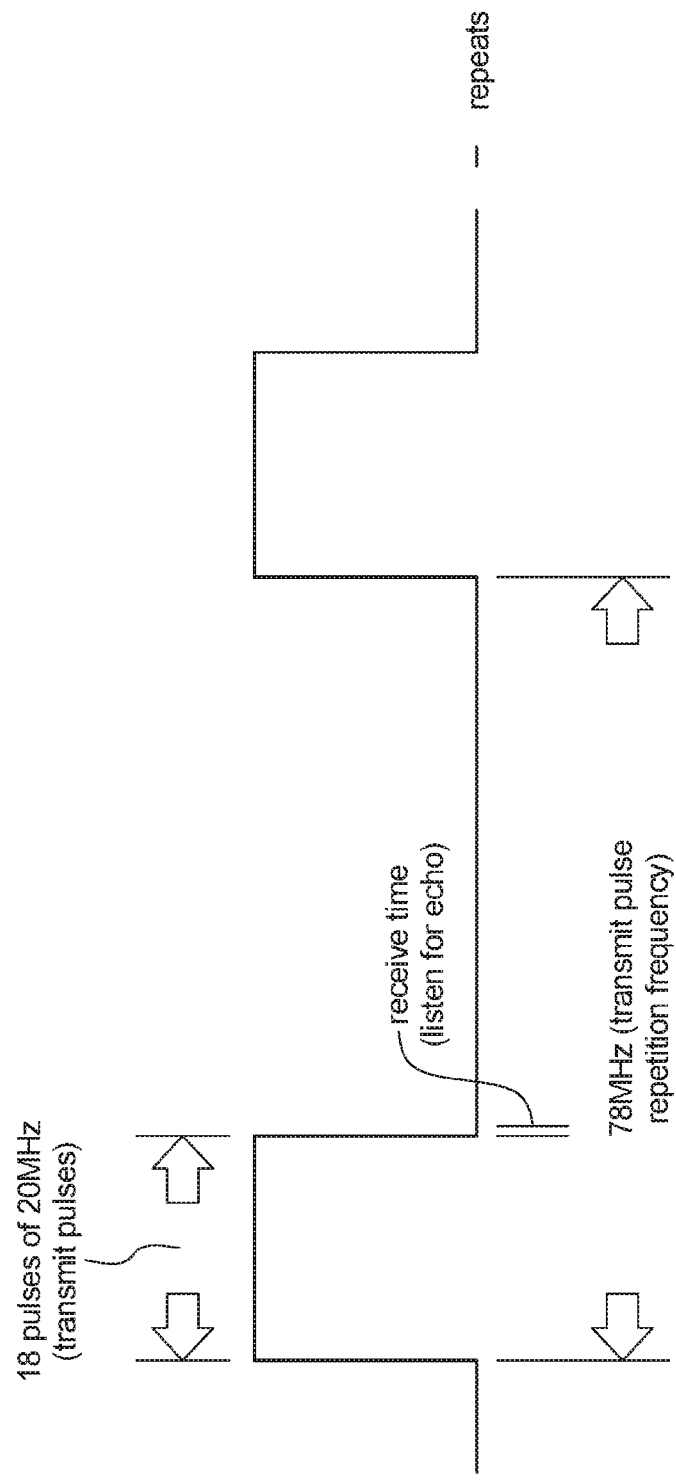
FIG. 8 is a schematic view of an example pulsed wave transmitted and received by the monitor according to an example embodiment of the present disclosure.

The Doppler Probe or transducer 106 may be a 20 MHz ultrasonic Doppler transducer that emits a pulsed ultrasonic signal when connected to monitor 150 via lead 110. For example, the monitor 150 may receive and transmit pulsed waves. In an example (as illustrated in FIG. 8) eighteen (18) pulses of 20 MHz are enveloped and sent as transmit pulses to the transducer 106. After receiving the transmit pulses, the pulses may excite the piezoelectric crystal such that the crystal vibrates and sends the ultrasonic signal through the vessel. The enveloped transmit pulses may repeat with a frequency of 78 kHz. After the transmit pulses are electronically stopped, the monitor 150 may receive or listen for a return signal. For example, monitor 150 may switch from transmitting pulses to receive or listen (e.g., for 6.4 µs) for a Doppler shifted echo immediately (deadband of 150 ns) after the transmission pulses. The Doppler shifted echo is transmitted back to the monitor. A varying audible signal (e.g., from the Doppler shifted echo) is produced when the probe or transducer 106 detects flow. The audible signal may be processed and filtered by monitor 150 before it is made available to the user.

As illustrated in FIG. 1A, transducer 106 may include a percutaneous lead (e.g., lead 108a of probe system 102a and lead 108b of probe system 102b, hereinafter referred to generally as lead 108) attached to its surface. The percutaneous lead 108 has a proximal end (e.g., end near transducer 106) and a distal end. The percutaneous lead 108 preferably comprises two wires insulated by a common insulating material. The wires may be any wires suitable for monitoring 20 MHz signals from the transducer 106. In an example, the insulating materials preferably comprise biocompatible materials, for example class VI medical grade materials. In an example, monitor 150 may have a transmission frequency of 20 MHz with a continuous reception pulsed wave transmission. The pulses may be repeated at a 156.25 KHz pulse repetition frequency.

At the proximal end, the percutaneous lead 108 may have one wire attached to each surface of the transducer 106. Any manufacturing method of attaching the two wires of lead 108 to each surface of the transducer 106 may be used in order to produce a strong conductive bond with the transducer 106 itself. Suitable methods include but are not limited to soldering, friction bonding, adhesive bonding, or attaching the lead during the manufacturing of the transducer. In an example, the bond strength between the transducer 106 and the two wires is preferably strong enough to allow for separation of the probe from the receptacles of the fastener by simply pulling on the lead itself. After its use, the transducer may either be left inside of the body within a receptacle, or it may be removed, e.g., by applying enough force to the percutaneous lead 108 so as to pull the transducer 106 from the receptacle, and to then pull the lead 108 through the skin and to the surface of the body. In an example, the strength of the bond between the transducer 106 and the percutaneous lead 108 is greater than a force necessary to remove the transducer 106 from the patient by applying a mechanical force to the percutaneous lead 108.

The distal end of the percutaneous lead 108 may be positioned within an optional bonding pad (not pictured) that is placed on the human skin. In an example, the bonding pad may be composed of medical grade material suitable for contact with human skin, for example, USP grade V or VI material. A variety of alternative approaches can be used to attach the lead to the skin, including for instance the use of patches and sutures. The bonding pad or alternative approaches may be attached to the skin in such a way that the force necessary to remove the pad or alternative approaches from the skin must be greater than the force necessary to separate the percutaneous lead 108 from an external lead 110a,b (hereinafter referred to generally as external lead 110). In a preferred embodiment, the force necessary to disconnect the percutaneous lead 108 from the external lead 110 should be less than the force necessary to remove the bonding pad or alternative attachment method (e.g., patch, suture, etc.) from the skin.

As illustrated in FIG. 1A, the distal end of the percutaneous lead 108 may be fitted with a connector 120a,b (hereinafter referred to generally as connector 120) that allows lead 108 to be further connected to a proximal end of an external lead 110. The external lead 110 is composed of any wire suitable for use in carrying signals and is insulated with materials suitable for skin contact. Preferably, the lead is adapted to carry a 20 MHz signal.

Preferably, the connector 120 is a medical grade electrical connector. In an example embodiment, the connector 120 is a non-locking connector. In another example, connector 120 is an electrical medical grade connector. Non-locking connectors are beneficial in reducing the probability of accidental removal of the transducer from the anastomosis site. That is, if the external lead 110 is accidentally tugged on, the non-locking connector 120 will cause it to disconnect from the percutaneous lead 108 without disturbing the transducer 106. The bonding pad or alternative attachment device may also help to prevent the transducer 106 from being disturbed.

The distal end of external lead 110 is connected to a monitor 150. It may be connected in any suitable manner. In an example embodiment, the lead 110 is connected using a connector 130 (e.g., connector 130a for external lead 110a and connector 130b for external lead 110b), which may be of the same type as connector 120. Connectors 120 and 130 may be metallic and may include a plastic housing.

As illustrated in FIG. 1A, both inputs or channels are utilized and connected to their own Doppler probes. Further, while the preferred multi-component probe system uses leads 108, 110 to connect the probe to the monitor 150, a wireless system may also be used wherein the probe is configured to communicate with the monitor 150 without the use of leads 108, 110.

FIG. 1B illustrates a perspective view of a flow monitor system 100B including a multi-component probe system 102a attached to a monitor 150 via external lead 110a. The embodiment illustrated in FIG. 1B shows probe system 102a attached to a single channel (e.g., "channel A") of monitor 150. It should be appreciated that more than two channels may be used. For example, monitor 150 may be capable of monitoring more than two channels.

Monitor Housing, Structure and Internal Components

Figure 2:
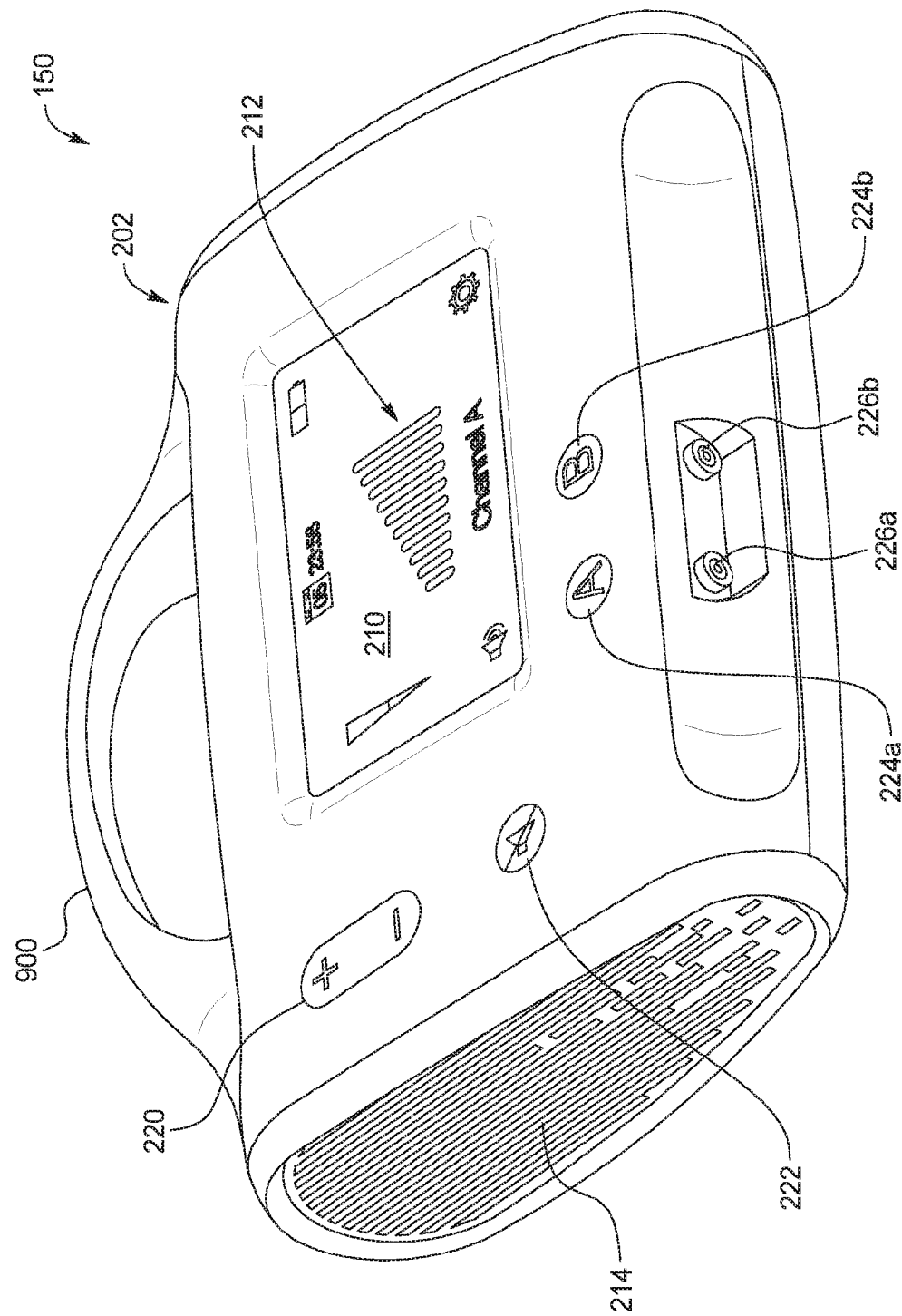
FIG. 2 is a perspective view of a monitor according to an example embodiment of the present disclosure.
Figure 3:
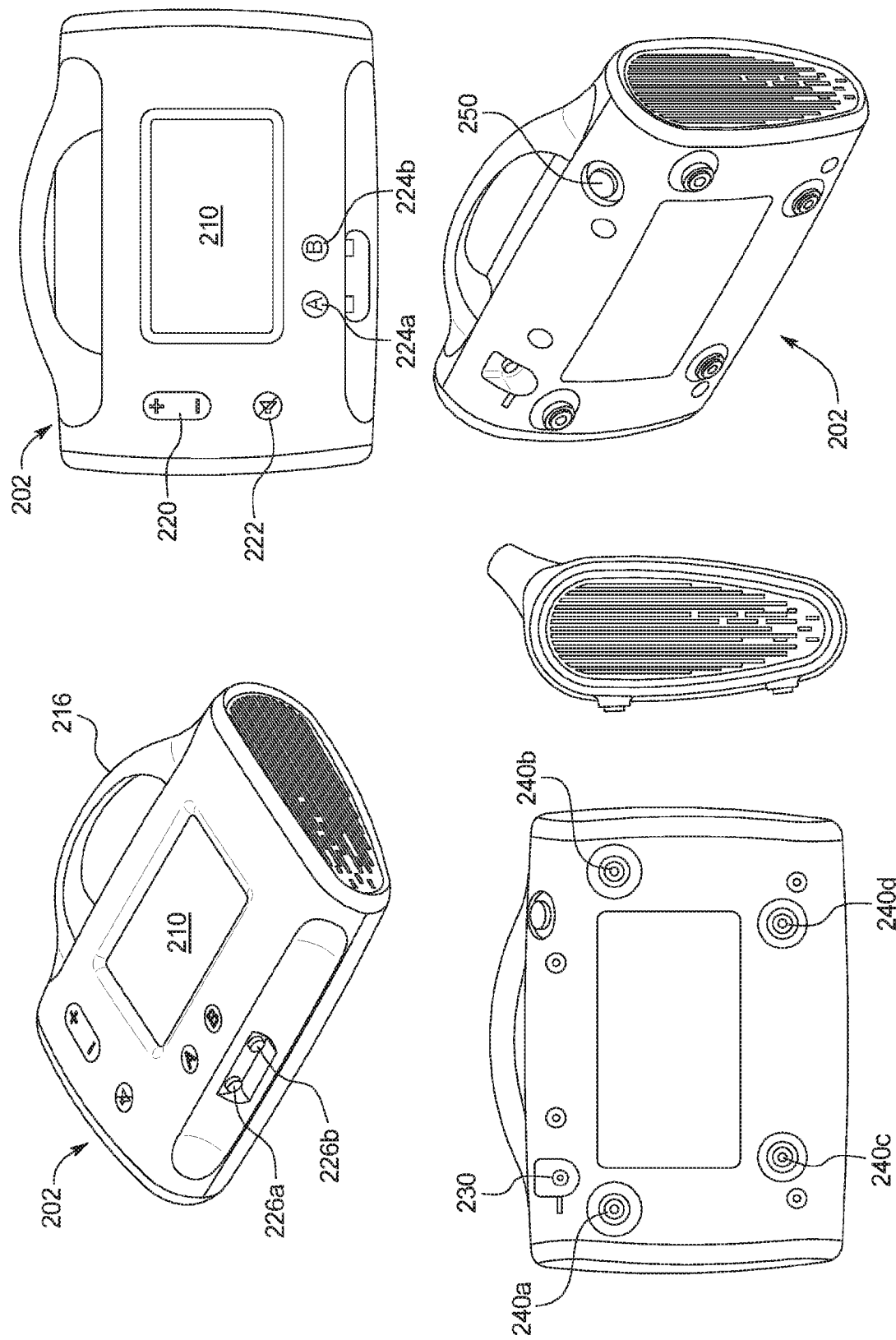
FIG. 3 shows various views of a monitor according to an example embodiment of the present disclosure.

FIG. 2 illustrates an isometric view of an example embodiment of monitor 150 and FIG. 3 illustrates various other views of monitor 150. Monitor 150 includes a housing 202 and a display or user interface 210, such as a color LCD touchscreen. Additionally, as illustrated in FIG. 2, monitor 150 includes speakers 214 and a handle 216. The housing 202 and handle 216 may be made from injection molded plastic (e.g., PC-ABS). Monitor 150 may also include various controls associated with the display 210 and/or speakers 214 such as a volume control 220 (e.g., volume control button or membrane switch), a mute control 222 (e.g., mute button or membrane switch) and a channel selection controls 224a and 224b (e.g., channel selection buttons or membrane switches for "channel A" and "channel B"). The channel selection controls are associated with connector ports 226a and 226b for receiving external leads 110. In one embodiment, monitor 150 may be approximately 6.17" D×8.18" W×3.20" H and may weight approximately 1.84 lb (0.83 kg). Additionally, as illustrated in FIG. 3, monitor 150 may include an AC power jack 230, feet 240a-d, and power control 250 (e.g., power button or membrane switch). Additionally, monitor 150 may have wireless capabilities for remote access to previously recorded audio and/or blood flow data, described in more detail in relation to FIG. 5.

Figure 4:
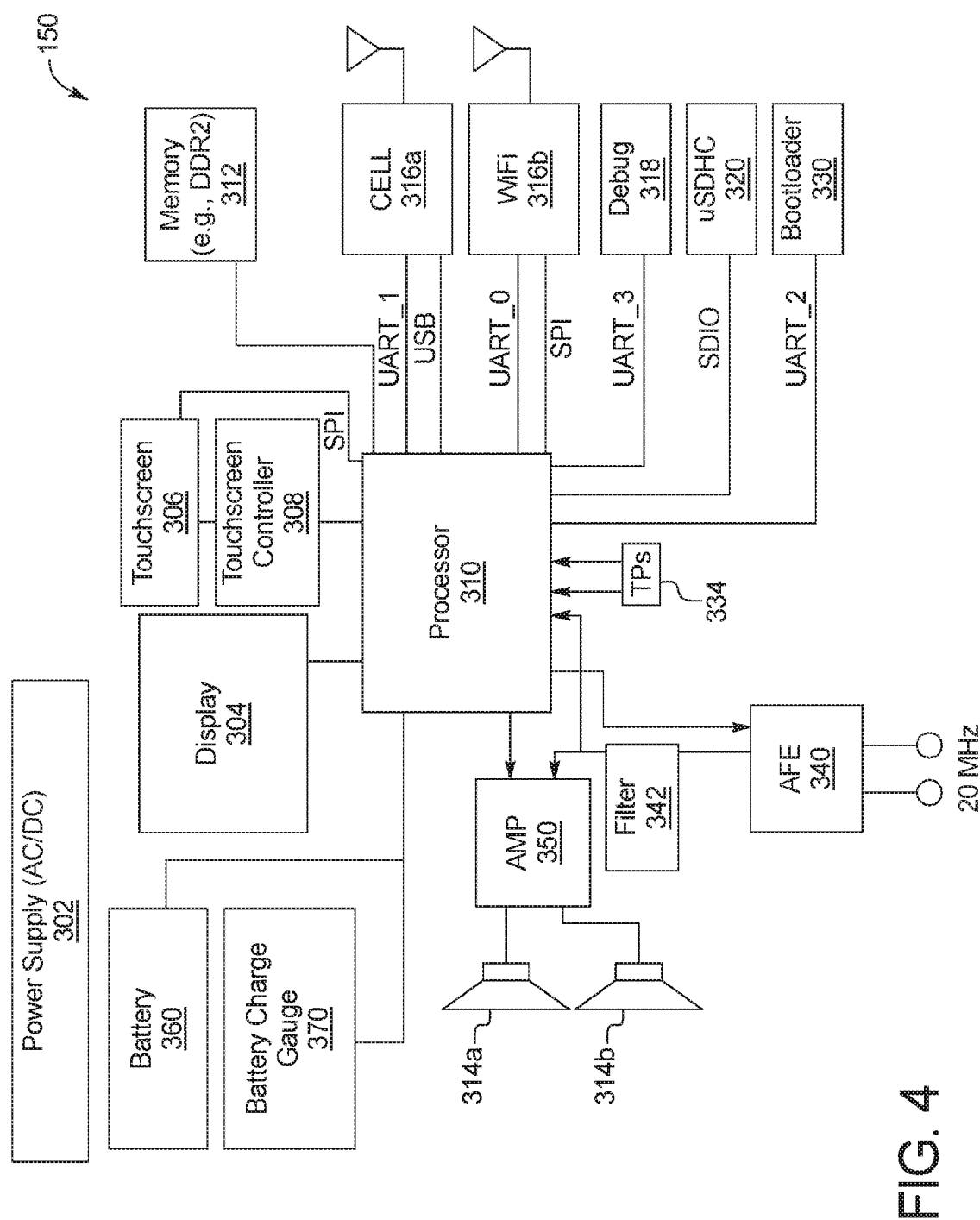
FIG. 4 is a schematic view of internal components of a monitor according to an example embodiment of the present disclosure.

FIG. 4 illustrates a schematic view of various internal components and modules of flow monitor 150. Monitor 150 may include a power supply 302, a user interface or display 304, a touchscreen 306, a touchscreen controller 308, a processor 310, memory 312, communication modules (e.g., cell communication module 316a and WiFi communication module 316b), a debug module 318, flash memory such as an ultra secure digital high capacity ("uSDHC") flash memory card, a bootloader 330, test points 334 for each channel (e.g., "channel A" and "channel B"), an analog front end ("AFE") 340, a filter module 342, an amplifier ("AMP") 350, speakers 314a and 314b (hereinafter referred to generally as speakers 314), battery 360 and battery charge gauge 370.

Processor 310 may communicate with touchscreen 306 via a serial peripheral interface ("SPI"). The touchscreen 306 may be a resistive touchscreen associated with display 304, such as a liquid crystal display. Several of the buttons (e.g., volume control 220, a mute control 222, and a channel selection controls 224a and 224b) illustrated in FIG. 2 may instead be displayed as graphical representations on display 210, 304 which are selectable by touch using touchscreen 306. Memory 312 may be DDR2 SDRAM and may temporarily store audio files before they are sent to a remote server or database by one or more of the communication modules. Communication modules (e.g., cell module 316a and WiFi module 316b) may communicate with processor 310 via a UART, a USB, a SPI or other acceptable interface to send and receive data from a remote server or database. Similarly, debug module 318 and bootloader 330 may also communicate with processor 310 via an interface (e.g., SPI). In an example, debug module 318 and bootloader 330 may be utilized for manufacturing tests, diagnostics and repair. The communication modules allow monitor 150 to provide remote monitoring to medical practitioners (e.g., surgeons), which will be described in more detail below. However, when on-site, medical practitioners (e.g., nurses and surgeons) may listen to generated audio that is amplified by AMP 350 and then sent to speakers 314a, 314b.

Signal Generation/Detection and Audiovisual Output

The monitor 150 generates a signal, which is sent to the transducer 106 (e.g., transducer 106 or probe emits a pulsed ultrasonic signal) and is transmitted through the vessel site. The transducer 106 then detects the signal transmitted through the vessel and sends the detected signal back to the monitor 150, which converts the signals into a form that can be read by the user. An audible signal of varying volume strength is produced when the probe detects flow. For example, the signals may be converted to sound or to a visual display or both.

The frequency (i.e., pitch) of the signal is proportional to the blood flow within the vessel. Distinctive tonal patterns are produced which are indicative of the flow pattern in terms of blood flow vs. time. Tonal patterns provide the surgeon with a qualitative indication of blood flow. The volume of the tone may be adjusted by means of a control on the monitor. A transmitter in the monitor periodically drives the ultrasonic crystal located at the tip of the probe. The ultrasonic waves generated by the crystal travel through the tissue just under the probe tip in a fairly narrow beam. They are then reflected back towards the probe whenever they encounter a boundary between tissues of different densities. During the intervals when the unit is not transmitting, the probe passes any reflected signals that it receives to a receiving circuit. This circuit amplifies the returning echoes, compares their frequency to that of the transmitted signal and converts any frequency differences into an audible tone.

The Doppler Probes and monitor 150 may be adapted to detect blood flow at the anastomotic site and confirm vessel patency intra-operatively and post-operatively at the anastomotic site. For example, blood flow can be detected post-operatively for up to approximately 7 days. Any monitor/probe combination capable of detecting audio output frequency and blood flow velocity may be used. Preferably, the combination is capable of detecting audio output frequency in the range of about 80 to about 3000 Hz and blood flow velocity in the range of 0.5 cm/sec to about 45 cm/sec.

In a preferred embodiment, the monitor 150 displays a visual numeric value representing the frequency shift of the Doppler signal. The use of a numeric value allows the surgeons to store and trend numbers over time in order to detect and analyze patterns. Optionally, these numbers may also be downloaded into computer software for further analysis. In another preferred embodiment, the monitor 150 allows for monitoring of at least two anastomosis sites. In this embodiment, the monitor 150 has one or more Doppler probe inputs (e.g., "channel A" and "channel B") and is capable of user selectable monitoring of either channel.

Monitor 150 is a pulsed Doppler ultrasound system designed for the detection of blood flow in vessels. The monitor 150, when used in conjunction with a probe system 102 may detect blood flow and confirm vessel patency intra-operatively and post-operatively at an anastomotic site. In an example, blood flow may be detected post-operatively on an as needed basis for several days (e.g., 7 days) after surgery. In an example, the monitor 150 connects to a probe or transducer, such as a 20 MHz ultrasonic Doppler Probe or transducer 106, which emits a pulsed ultrasonic signal when connected to monitor 150 via lead 110. A varying audible signal is produced when the probe or transducer 106 detects flow. The audible signal may be displayed or emitted from monitor 150, as discussed in more detail below.

As illustrated in FIG. 2, the display or user interface 210 provides a qualitative visual indication 212 of blood flow. In an example, the visual indication 212 may include various bars that each represent a frequency range or blood flow velocity threshold. For example, visual indication 212 of monitor 150 may be able to indicate blood flow velocities as low as 0.5 cm/s or 0.75 cm/s and may also be able to indicate blood flow velocities as high as 45 cm/s. Monitor 150 may also emit an audible indication of blood flow via speakers 214. Prior to displaying the visual indication and/or emitting the audible indication, the monitor 150 may filter the signal for noise reduction. For example, monitor 150 may digitally filter the returned audio signal from the probe or transducer 106 to reduce or remove noise.

In another example, monitor 150 may display a visual numeric value representing the blood flow or blood flow velocity (e.g., the frequency shift of the Doppler signal). The use of a qualitative visual indication 212 or a numeric value allows the medical practitioners (e.g., surgeons) to review an additional indication of blood flow (other than an audio signal) to analyze vessel patency after surgery. Optionally, these numbers and/or visual indications may also be stored in a database (described in more detail below with reference to FIG. 5 and FIG. 6) for further analysis.

Visual indication 212, which is displayed on user interface 210 (or on user device 402 described in more detail below) advantageously provides a secondary indicator of blood flow to enable a medical practitioner to monitor and analyze a patient's blood flow in noisy environments. For example, an operating room may have several other sources of ambient noise from other medical equipment, other medical personnel, etc. and the visual indication 212 may be monitored regardless of the amount of ambient noise. Conversely, the audible indication may be difficult to analyze and distinguish from other sources of interference or noise.

Referring back to FIG. 4, the analog front end 340 receives signals or pulses from processor 310. For example, AFE 340 may receive 1 uSec and 0.8 uSec pulses @ 78 KHz from processor 310, which are then sent to Doppler probes or transducers 106. Then, AFE 340 receives return signals (e.g., of a phase shift) from the transducers 106, which are converted to audio signals and sent to filter 342 and/or AMP 350. The audio signals represent a phase shift or a Doppler shift detected by monitor 150, which is converted into audio. For example, ultrasonic energy bounces off red blood cells within a vessel at the anastomotic site, which causes a phase shift if the signal emitted from transducers 106. This phase shift is detected and converted into audio. Specifically, the signal that is proportional to the Doppler shift frequency and also to the blood velocity.

Digital Signal Filtering

In some cases, especially for low blood flow velocities, the audio sample may be indistinguishable or difficult to distinguish between background noise. Additionally, low blood flow velocities may require a medical practitioner (e.g., a surgeon) to increase the volume of monitor's speakers, which would become distracting or annoying when emitting mostly background noise. Specifically, medical practitioners (e.g., surgeons) determine vessel patency by a distinct sound or audio signal, which is often difficult to detect when lost of muffled with the "hiss" of background noise from speakers 214, 314. By digitally filtering the signal, the audio sample is clearly separated and removed from the background noise so that it can be easily identified and reviewed by a medical practitioner without the annoying "buzz" or "hiss" of background noise emitted from the speakers.

The audio signal may be digitally filtered to control background noise levels. For example, filter module 342 may wave shape the audio signal via filter module 342, which may utilize low band pass and high band pass digital filtering. In another example, filter module 342 may perform a fast Fourier transform (FFT) of the signal to divide the audio signal into multiple frequency components that are digitally filtered. The digital filtering may include applying a bandpass (low and high) filter and a signal boost (e.g., a boost of 236 Hz).

Additionally, audio from low blood flow velocities is typically difficult to distinguish from the low frequency roll-off of the speakers. To improve audio quality, the signal may receive a boost (e.g., a boost of 236 Hz) before wave shaping to pull up low-end frequencies up over the low frequency roll-off of the speakers. The digital filtering described herein advantageously improves the noise reduction while the monitor's capability to produce the audible signal remains unchanged while blood flow is detected at specific velocity ranges. Digital filtering advantageously allows a medical practitioner to easily detect low, faint signals associated with a low blood velocity. Without the digital filtering, the audio signal may be lost or muffled within background noise emitted from speakers 214, 314.

Remote Monitoring

Figure 5:
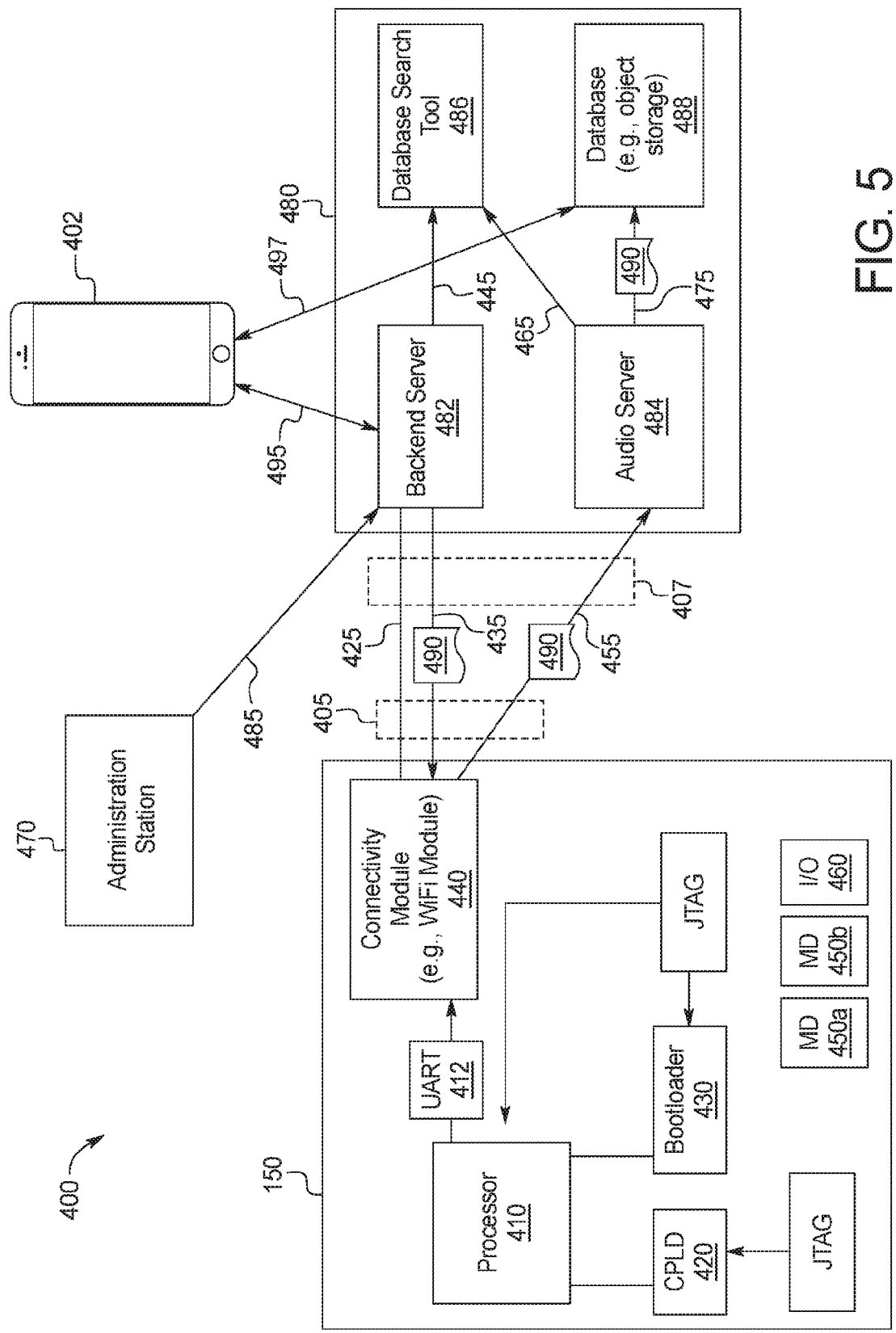
FIG. 5 is a schematic view of an example monitoring system according to an example embodiment of the present disclosure.

FIG. 5 illustrates an example system 400 with monitor 150 communicating with one or more of an administration station 470, cloud computing infrastructure 480 and a user device 402. The administration station 470 may be used to apply configurations and permissions to various mobile devices or user devices 402 communicating with the cloud computing infrastructure 480. Monitor 150 may include each of the components illustrated in FIGS. 2 to 4. As illustrated in FIG. 5, several monitor components (some of which were previously described in FIG. 4) are illustrated such as a processor 410, a receiver-transmitter such as a universal asynchronous receiver-transmitter ("UART") 412, a complex programmable logic device ("CPLD") 420, a bootloader 430, a connectivity module 440, memory devices 450a and 450b (referred to generally as memory device 450), and input/output (I/O) device 460.

Monitor 150 may communicate with a cloud computing infrastructure 480 (e.g., Amazon Web Services ("AWS")), which may include a backend server 482 (e.g. backend AWS Elastic Compute Cloud ("EC2") server), an audio server 484, a database search tool (e.g., Mongo DB), and a database 488 (e.g., Amazon Simple Storage Service ("S3")). Communication between monitor 150 and cloud computing infrastructure 480 via communication module 440, such as a WiFi module, may be encrypted. For example, communication encryption at 405 may include over-the-air ("OTA") encryption with Wi-Fi Protected Access ("WPA") or Wi-Fi Protected Access II ("WPA2"). Additionally, communication between monitor 150 and cloud computing infrastructure 480 may utilize a communication protocol at 407, such as Transport Layer Security ("TLS") protocol to provide secure communication on the Internet for data transfers, for example, when transferring a patient's audio files 490 to a remote server (e.g., backend server 482 or audio server 484) or database 488.

When communicating, backend server 482 may request device status or query for latest audio sample from monitor 150 at arrow 425. For example, backend server 482 may request device status such as transducer ID, what channel on the monitor is active or whether the monitor is actively listening (e.g., recording audio samples). Additionally, backend server 482 may query monitor 150 for the latest audio sample. For example, device status and/or audio samples of monitor 150 may be communicated between connectivity module 440 and backend server 482. Additionally, the backend server 482 may get audio information, such as an audio file 490, from monitor 150 at arrow 435 via connectivity module 440. Both the device status information and the audio information may be passed to the database search tool 486 at arrow 445. The monitor 150 may also upload the audio information, such as audio file 490, to audio server 484 at arrow 455. The audio server 484 may store data, such as audio information, to the database search tool 486 at arrow 465. Additionally, the audio server 484 may store audio information, such as audio file 490, to database 488 at arrow 475.

Medical practitioners, such as nurses may communicate with and manage data within cloud computing infrastructure 480 at arrow 485. In an example, probe or transducer ID or model number, audio identification information, patient identification information, hospital information, or medical practitioner (e.g., surgeon) information may be associated with a specific patient, audio identifier, probe or transducer 106, and or medical practitioner (e.g., surgeon) such that only certain audio files that the surgeon has been given access to can be retrieved by that surgeon through his or her user device 402. The communication between administration station 470 and cloud computing infrastructure 480 may also utilize a communication protocol such as TLS. Other medical practitioners or privileged users, such as surgeons, may request audio at arrow 495 and play audio at arrow 497 by communicating with the cloud computing infrastructure 480. Specifically, the user device 402 may communicate with the backend server 482 and the database 488 to play audio file 490.

As used herein, physical processor or processor 410 refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). Additionally a processor may be a microprocessor, microcontroller or microcontroller unit (MCU).

As discussed herein, a memory device 450 refers to a volatile or non-volatile memory device, such as random access memory (RAM), read-only memory (ROM), electrically erasable programmable read-only memory (EEPROM), or any other device capable of storing data. As discussed herein, I/O device 460 refers to a device capable of providing an interface between one or more processor pins and an external device capable of inputting and/or outputting binary data.

Processor 410 may be interconnected using a variety of techniques, ranging from a point-to-point processor interconnect, to a system area network, such as an Ethernet-based network. Local connections within monitor 150, including the connections between a processor 410, CPLD 410, connectivity module 440, memory devices 450, and I/O device 460 may be provided by one or more local buses of suitable architecture, for example, peripheral component interconnect (PCI).

Application for Remote Monitoring

In some circumstances, a medical practitioner (e.g., a surgeon) may not be on-site to review and analyze the audible indication emitted from monitor 150 and/or the qualitative visual indication 212 displayed by monitor 150. In those instances, either the patient would have to wait for the surgeon to return to the hospital operating room or post-anesthesia care unit or the information could be conveyed to the surgeon from another practitioner or staff member. For example, in some instances, the surgeon may try to listen to the audible indication (e.g., audio played by monitor 150) in real time over the phone, which may result in a degraded signal depending on cell reception, cell carrier, etc. The inconvenience of having to be on site to review and analyze a patient's blood flow data typically resulted in less frequent monitoring.

To improve the accessibility and ease of monitoring a patient, the user device 402 may run an application to remotely access the audio files 490 stored on database 488. Medical practitioners (e.g., nurses) may assign access credentials to specific medical practitioners (e.g., surgeons) at the administration station 470. Once provided with access rights or privileges, users (e.g., surgeons) using the monitoring application on user device 402 may retrieve and play audio files associated with a specific implanted Doppler probe or transducer 106. For example, blood flow audio files for multiple patients in multiple different hospitals may be stored on database 488, but "Surgeon_A" may be assigned access rights or privileges to listen to audio files associated with "Doppler Probe_A" implanted in "Patient A". Similarly, "Surgeon_B" may be assigned access rights or privileges to listen to audio files associated with "Doppler Probe_B" implanted in "Patient B" as well as "Doppler Probe_C" implanted in "Patient C".

Figure 6:
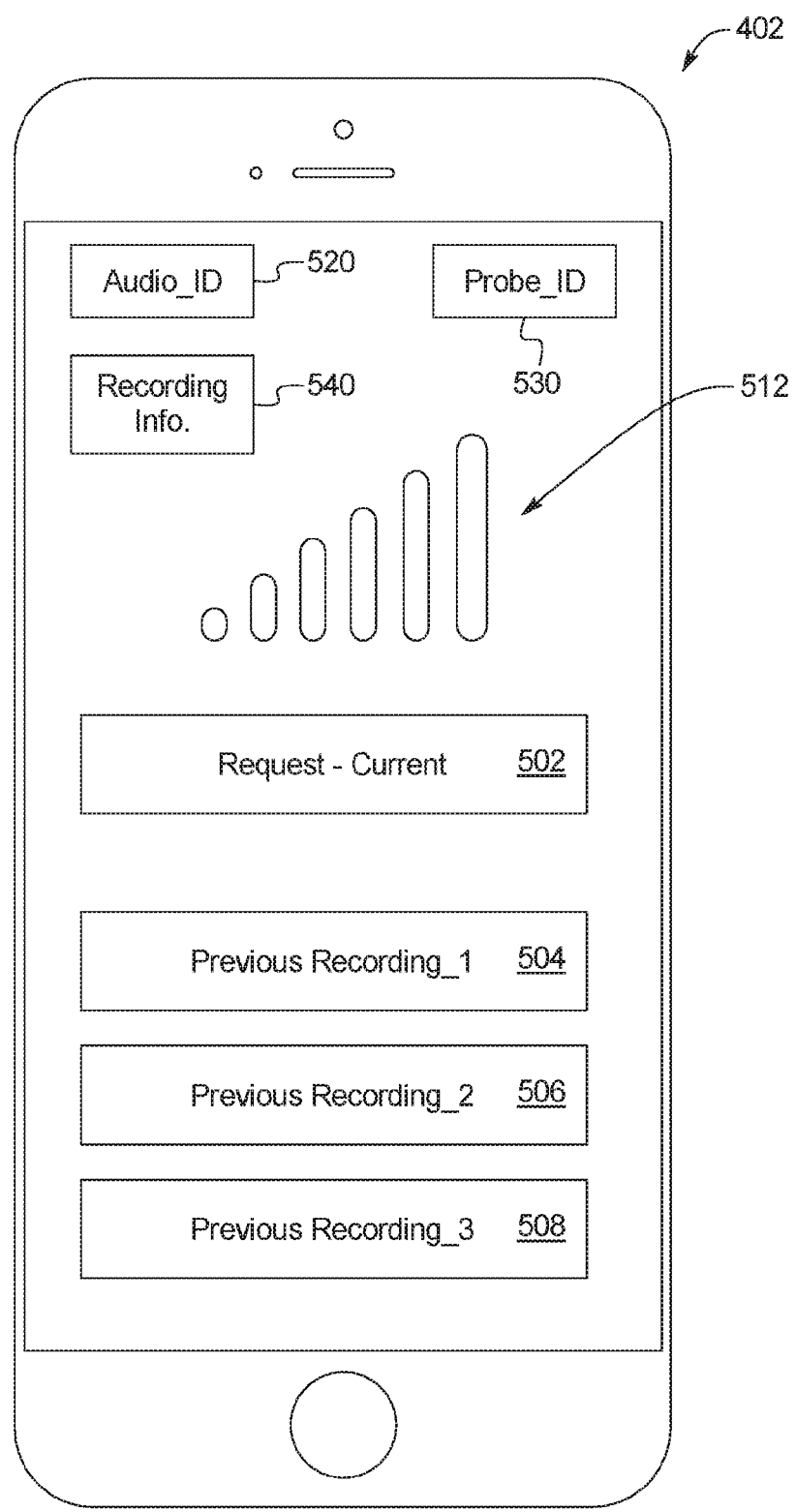
FIG. 6 is a schematic view of a user interface displaying a monitoring application on a user device according to an example embodiment of the present disclosure.

When accessing audio files on user device 402, a medical practitioner (e.g., surgeon) may request to listen to a "current" blood flow audio file. For example, as illustrated in FIG. 6, a medical practitioner (e.g., surgeon) may select the graphical representation of the "Request-Current" button 502 to listen to a "current recording" of the blood flow at the anastomotic site. In an example, selecting the "Request-Current" button 502 may initiate a recording and thus may not be a real-time audio signal of the blood flow, but instead may be delayed by a brief period (e.g., 10 seconds, 15 seconds, 20 seconds, etc.). For example, by selecting button 502, a 15 second recording of the audio signal of the patient's blood flow may be recorded and uploaded to database 488, which may then be retrieved and played by user device 402 to provide an audible indication of blood flow via speakers of user device 402. The application may also allow a medical practitioner (e.g., surgeon) to play, listen to and review previous audio recordings for that patient. For example, by selecting any of the graphical representations of the "Previous Recording_1", "Previous Recording_2", or "Previous Recording_3" buttons 504, 506 or 508 respectively, the medical practitioner (e.g., surgeon) may listen to previous recordings of the audio signal of the patient's blood flow. By doing so, the surgeon may be able to compare the audio signals and determine if the patient's blood flow is improving, worsening or staying approximately the same.

Recordings may be for time intervals ranging from 5 seconds to 20 seconds, but it should be appreciated that other time intervals may be used. In another example, the time interval may be selectable by the medical practitioner (e.g., surgeon) through the mobile application.

In another example, the application may provide a qualitative visual indication 512 of blood flow, similar to that of the qualitative visual indication 212 illustrated in FIG. 2. In an example, the visual indication 512 may include various bars that each represent a frequency range or blood flow velocity threshold. Similar to the qualitative visual indication 212 of monitor 150 discussed above, qualitative visual indication 512 of the application on user device 402 may be able to indicate blood flow velocities as low as 0.5 cm/s or 0.75 cm/s and as high as 45 cm/s.

For instance, various aspects concerning blood flow within a vessel can be monitored and recorded. With access to several previous recordings, a medical practitioner (e.g., surgeon) can make an objective comparison between a current recording and previous recordings. For example, the qualitative visual indication 512 associated with a recording may provide a baseline value that can be compared to other recordings.

The application may display an audio ID 520, a probe ID 530 and other recording information 540 so that the medical practitioner can confirm which patient and/or probe the audio file corresponds to. Additionally, the recording information 540 may indicate the date and time of the recording, etc.

It should be appreciated that user device 402 may be a smartphone, tablet, laptop, computer, smartwatch, or any other suitable device.

Aspects of the subject matter described herein may be useful alone or in combination with one or more other aspects described herein. In a first exemplary aspect of the present disclosure, a Doppler blood flow monitoring device includes a signal generation module, a signal reception module, a signal filtration module, a signal conversion module, at least one speaker, and a user interface. The signal generation module is configured to send a signal to a probe positioned in a probe receptacle on a vascular coupler positioned about a patient's vessel. The signal reception module is configured to receive a return signal from the probe. The signal filtration module is configured to filter the return signal. The signal conversion module is configured to convert the filtered signal into an audible indication and a visual indication corresponding to a characteristic of blood flow in the patient's vessel. The at least one speaker is configured to emit the first audible indication. Additionally, the user interface is configured to display the visual indication.

In accordance with another exemplary aspect of the present disclosure, which may be used in combination with any one or more of the preceding aspects, the signal sent by the signal generation module is a pulsed ultrasonic signal.

In accordance with another exemplary aspect of the present disclosure, which may be used in combination with any one or more of the preceding aspects, the signal sent by the signal generation module is a pulse wave Doppler signal.

In accordance with another exemplary aspect of the present disclosure, which may be used in combination with any one or more of the preceding aspects, filtering the return signal includes at least one of applying a low band-pass filter to the return signal, applying a high band-pass filter to the return signal, and applying a fast Fourier transform to the return signal.

In accordance with another exemplary aspect of the present disclosure, which may be used in combination with any one or more of the preceding aspects, filtering the return signal includes applying a frequency adjustment to the return signal. The frequency adjustment is applied to the return signal prior to wave shaping the return signal.

In accordance with another exemplary aspect of the present disclosure, which may be used in combination with any one or more of the preceding aspects, the frequency adjustment is a frequency boost between 150 Hz and 300 Hz.

In accordance with another exemplary aspect of the present disclosure, which may be used in combination with any one or more of the preceding aspects, the frequency boost is between 230 Hz and 240 Hz.

Aspects of the subject matter described herein may be useful alone or in combination with one or more other aspects described herein. In a second exemplary aspect of the present disclosure, a Doppler blood flow monitoring system includes a vascular coupler, a transducer, and a monitor. The vascular coupler is positioned about a patient's vessel. The transducer is attached to the vascular coupler. The monitor is configured to generate a signal to send to the transducer and the transducer is configured to emit an ultrasonic signal based on the signal generated by the monitor. Additionally, the ultrasonic signal is transmitted through the patient's vessel. The monitor is also configured to receive a return signal from the transducer and convert the return signal into a first indication and a second indication corresponding to a characteristic of blow flow in the patient's vessel.

In accordance with another exemplary aspect of the present disclosure, which may be used in combination with any one or more of the preceding aspects, the first indication is an audible indication.

In accordance with another exemplary aspect of the present disclosure, which may be used in combination with any one or more of the preceding aspects, the second indication is a visible indication.

In accordance with another exemplary aspect of the present disclosure, which may be used in combination with any one or more of the preceding aspects, the vascular coupler is a first vascular coupler and the transducer is a first transducer. Additionally, the first vascular coupler and the first transducer are associated with a first channel of the monitor. In an example, the system also includes a second vascular coupler positioned about a different vessel of the patient and a second transducer. The second vascular coupler and the second transducer are associated with a second channel of the monitor. Additionally, the monitor is further configured to generate another signal to send to the second transducer, receive a different return signal from the second transducer, and convert the different return signal into a primary indication and a secondary indication corresponding to a characteristic of blow flow in the different vessel of the patient.

In accordance with another exemplary aspect of the present disclosure, which may be used in combination with any one or more of the preceding aspects, the primary indication is an audible indication.

In accordance with another exemplary aspect of the present disclosure, which may be used in combination with any one or more of the preceding aspects, the secondary indication is a visible indication.

In accordance with another exemplary aspect of the present disclosure, which may be used in combination with any one or more of the preceding aspects, the signal emitted from the transducer is a pulsed ultrasonic signal.

In accordance with another exemplary aspect of the present disclosure, which may be used in combination with any one or more of the preceding aspects, the signal generated by the monitor is a pulsed ultrasonic signal.

In accordance with another exemplary aspect of the present disclosure, which may be used in combination with any one or more of the preceding aspects, the signal emitted from the transducer is a pulse wave Doppler signal.

In accordance with another exemplary aspect of the present disclosure, which may be used in combination with any one or more of the preceding aspects, the signal generated by the monitor is a pulse wave Doppler signal.

In accordance with another exemplary aspect of the present disclosure, which may be used in combination with any one or more of the preceding aspects, the transducer is removably retained within the vascular coupler.

In accordance with another exemplary aspect of the present disclosure, which may be used in combination with any one or more of the preceding aspects, the transducer is removably retained within the vascular couple by at least one of a friction fit, a mechanical coupler, and adhesive.

In accordance with another exemplary aspect of the present disclosure, which may be used in combination with any one or more of the preceding aspects, the vascular coupler is adapted to permit the transducer to be later removed from a receptacle of the vascular coupler.

In accordance with another exemplary aspect of the present disclosure, which may be used in combination with any one or more of the preceding aspects, the monitor is further configured to filter the return signal prior to converting the return signal into at least one of the first indication and the second indication.

In accordance with another exemplary aspect of the present disclosure, which may be used in combination with any one or more of the preceding aspects, filtering the return signal includes at least one of applying a low band-pass filter to the return signal, applying a high band-pass filter to the return signal, and applying a fast Fourier transform to the return signal.

In accordance with another exemplary aspect of the present disclosure, which may be used in combination with any one or more of the preceding aspects, filtering the return signal includes applying a frequency adjustment to the signal, wherein the frequency adjustment is applied to the return signal prior to wave shaping the return signal.

In accordance with another exemplary aspect of the present disclosure, which may be used in combination with any one or more of the preceding aspects, the frequency adjustment is a frequency boost between 150 Hz and 300 Hz.

In accordance with another exemplary aspect of the present disclosure, which may be used in combination with any one or more of the preceding aspects, the frequency boost is between 230 Hz and 240 Hz.

In accordance with another exemplary aspect of the present disclosure, which may be used in combination with any one or more of the preceding aspects, the transducer comprises a piezoelectric crystal.

Aspects of the subject matter described herein may be useful alone or in combination with one or more other aspects described herein. In a third exemplary aspect of the present disclosure, a remote monitoring system includes a monitor and a remote database. The monitor is configured to generate a signal to send to a transducer positioned within a vascular coupler. The vascular coupler is positioned about a patient's vessel, the transducer is configured to emit an ultrasonic signal based on the signal generated by the monitor, and the ultrasonic signal is transmitted through the patient's vessel. The monitor is further configured to receive a return signal from the transducer and convert the return signal into a first indication and a second indication corresponding to a characteristic of blow flow in the patient's vessel. The remote database configured to receive one or more files associated with the first indication and store the one or more files associated with the first indication, wherein the one or more files are remotely accessible via a user device.

In accordance with another exemplary aspect of the present disclosure, which may be used in combination with any one or more of the preceding aspects, the monitor is further configured to filter the return signal prior to converting the return signal into at least one of the first indication and the second indication.

In accordance with another exemplary aspect of the present disclosure, which may be used in combination with any one or more of the preceding aspects, filtering the return signal includes at least one of applying a low band-pass filter to the return signal, applying a high band-pass filter to the return signal, and applying a fast Fourier transform to the return signal.

In accordance with another exemplary aspect of the present disclosure, which may be used in combination with any one or more of the preceding aspects, filtering the return signal includes applying a frequency adjustment to the signal, wherein the frequency adjustment is applied to the return signal prior to wave shaping the return signal.

In accordance with another exemplary aspect of the present disclosure, which may be used in combination with any one or more of the preceding aspects, the frequency adjustment is a frequency boost between 150 Hz and 300 Hz.

In accordance with another exemplary aspect of the present disclosure, which may be used in combination with any one or more of the preceding aspects, the frequency boost is between 230 Hz and 240 Hz.

In accordance with another exemplary aspect of the present disclosure, which may be used in combination with any one or more of the preceding aspects, the remote database is further configured to receive one or more files associated with the second indication and store the one or more files associated with the second indication. Additionally, the one or more files associated with the second indication are remotely accessible via a user device.

The many features and advantages of the present disclosure are apparent from the written description, and thus, the appended claims are intended to cover all such features and advantages of the disclosure. Further, since numerous modifications and changes will readily occur to those skilled in the art, the present disclosure is not limited to the exact construction and operation as illustrated and described. Therefore, the described embodiments should be taken as illustrative and not restrictive, and the disclosure should not be limited to the details given herein but should be defined by the following claims and their full scope of equivalents, whether foreseeable or unforeseeable now or in the future.

The invention is claimed as follows:

1. A system comprising:
a Doppler blood flow monitoring device configured to:
send a signal to a probe positioned in a probe receptacle on a vascular coupler positioned about a patient's vessel;
receive a return signal from the probe;
filter the return signal;
convert the filtered signal into a first audible indication and a visual indication corresponding to a characteristic of blood flow in the patient's vessel, wherein the visual indication includes a plurality of bars, wherein each respective bar of the plurality of bars represents a blood velocity threshold, wherein the visual indication is displayed on a user device, and wherein the Doppler blood flow monitoring device comprises at least one speaker configured to emit the first audible indication; and
wirelessly transfer, via a connectivity module, the first audible indication from the Doppler blood flow monitoring device to a remote database, wherein the first audible indication is remotely accessible via the user device, wherein an administration station is configured to apply permission to the user device to access the first audible indication associated with the Doppler blood flow monitoring device, wherein the user device may request the Doppler blood flow monitoring device to record and upload a second audible indication, wherein the second audible indication is a current recording of blood flow, and wherein the current recording of blood flow is a delayed real-time recording of blood flow with a delay of up to 20 seconds.

2. The device of claim 1, wherein the signal sent by the Doppler blood flow monitoring device is at least one of (i) a pulsed ultrasonic signal and a pulse wave Doppler signal.

3. The device of claim 1, wherein filtering the return signal includes at least one of (i) applying a low band-pass filter to the return signal, (ii) applying a high band-pass filter to the return signal, (iii) applying a fast Fourier transform to the return signal, and (iv) applying a frequency adjustment to the return signal, wherein the frequency adjustment is applied to the return signal prior to wave shaping the return signal.

4. The device of claim 3, wherein the frequency adjustment is a frequency boost between 230 Hz and 240 Hz.

5. A Doppler blood flow monitoring system comprising:
a vascular coupler positioned about a patient's vessel;
a transducer attached to the vascular coupler; and
a monitor configured to:
generate a signal to send to the transducer, wherein the transducer is configured to emit an ultrasonic signal based on the signal generated by the monitor, and wherein the ultrasonic signal is transmitted through the patient's vessel,
receive a return signal from the transducer,
convert the return signal into a first indication and a second indication corresponding to a characteristic of blood flow in the patient's vessel, wherein the second indication is a visible indication including a plurality of bars, wherein each respective bar of the plurality of bars represents a blood velocity threshold, wherein the second indication is displayed on a user device, and wherein the user device is configured to retrieve the first indication from a remote database, and
wirelessly transfer, via a connectivity module, the first indication from the monitor to the remote database, wherein the first indication is remotely accessible via the user device, wherein an administration station is configured to apply permission to the user device to access the first indication associated with the Doppler blood flow monitoring system, wherein the user device may request the Doppler blood flow monitoring device to record and upload a third indication, wherein the third indication is derived from a current recording of blood flow, and wherein the current recording of blood flow is a delayed real-time recording of blood flow with a delay of up to 20 seconds.

6. The monitoring system of claim 5, wherein the first indication is a first audible indication.

7. The Doppler blood flow monitoring system of claim 5, wherein the vascular coupler is a first vascular coupler and the transducer is a first transducer, and wherein the first vascular coupler and the first transducer are associated with a first channel of the monitor, and which further comprises:
- a second vascular coupler positioned about a different vessel of the patient;
- a second transducer, wherein the second vascular coupler and the second transducer are associated with a second channel of the monitor; and
- the monitor is further configured to:
  - generate another signal to send to the second transducer,
  - receive a different return signal from the second transducer, and
  - convert the different return signal into a primary indication and a secondary indication corresponding to a characteristic of blood flow in the different vessel of the patient.

8. The monitoring system of claim 7, wherein the primary indication is an audible indication and the secondary indication is a visible indication.

9. The monitoring system of any of claim 5, wherein the signal emitted from the transducer is at least one of a pulsed ultrasonic signal and a pulse wave Doppler signal, and wherein the signal generated by the monitor is at least one of a pulsed ultrasonic signal and a pulse wave Doppler signal.

10. The monitoring system of claim 5, wherein the transducer is removably retained within the vascular coupler.

11. The monitoring system of claim 5, wherein the vascular coupler is adapted to permit the transducer to be later removed from a receptacle of the vascular coupler.

12. The monitoring system of claim 5, wherein the monitor is further configured to filter the return signal prior to converting the return signal into at least one of the first indication and the second indication, and wherein filtering the return signal includes at least one of (i) applying a low band-pass filter to the return signal, (ii) applying a high band-pass filter to the return signal, (iii) applying a fast Fourier transform to the return signal, and (iv) applying a frequency adjustment to the signal, wherein the frequency adjustment is applied to the return signal prior to wave shaping the return signal.

13. The monitoring system of claim 12, wherein the frequency adjustment is a frequency boost between 150 Hz and 300 Hz.

14. The monitoring system of claim 5, wherein the transducer comprises a piezoelectric crystal.

15. A remote monitoring system comprising:
- a monitor configured to:
  - generate a signal to send to a transducer positioned within a vascular coupler, wherein
    - the vascular coupler is positioned about a patient's vessel,
    - the transducer is configured to emit an ultrasonic signal based on the signal generated by the monitor, and
    - the ultrasonic signal is transmitted through the patient's vessel, receive a return signal from the transducer,
  - convert the return signal into a first indication and a second indication corresponding to a characteristic of blood flow in the patient's vessel, wherein the second indication is a visible indication including a plurality of bars, wherein each respective bar of the plurality of bars represents a blood velocity threshold, wherein the second indication is displayed on a user device, and
  - wirelessly transfer, via a connectivity module, the first indication from the monitor to a remote database, wherein an administration station is configured to apply permission to the user device to access the first indication associated with the remote monitoring system, wherein the user device may request the Doppler blood flow monitoring device to record and upload a third indication, wherein the third indication is derived from a current recording of blood flow, wherein the current recording of blood flow is a delayed real-time recording of blood flow with a delay of up to 20 seconds, and wherein the remote database is configured to:
    - receive one or more files associated with the first indication, and
    - store the one or more files associated with the first indication, wherein the one or more files are remotely accessible via the user device.

16. The remote monitoring system of claim 15, wherein the monitor is further configured to filter the return signal prior to converting the return signal into at least one of the first indication and the second indication.

17. The remote monitoring system of claim 16, wherein filtering the return signal includes at least one of applying a low band-pass filter to the return signal, applying a high band-pass filter to the return signal, and applying a fast Fourier transform to the return signal.

18. The remote monitoring system of claim 16, wherein filtering the return signal includes applying a frequency adjustment to the signal, wherein the frequency adjustment is applied to the return signal prior to wave shaping the return signal.

19. The remote monitoring system of claim 18, wherein the frequency adjustment is a frequency boost between 150 Hz and 300 Hz.

20. The remote monitoring system of claim 15, wherein the remote database is configured to:
- receive one or more files associated with the second indication, and
- store the one or more files associated with the second indication, wherein the one or more files associated with the second indication are remotely accessible via the user device.

* * * * *